(12) United States Patent
Takahashi et al.

(10) Patent No.: US 8,844,380 B2
(45) Date of Patent: Sep. 30, 2014

(54) TORQUE SENSOR

(71) Applicant: Denso Corporation, Kariya (JP)

(72) Inventors: Yoshiki Takahashi, Okazaki (JP);
Shigetoshi Fukaya, Toyota (JP); Hideki Kabune, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/063,136

(22) Filed: Oct. 25, 2013

(65) Prior Publication Data

US 2014/0130612 A1 May 15, 2014

(30) Foreign Application Priority Data

Nov. 15, 2012 (JP) .................. 2012-251304
Jul. 25, 2013 (JP) .................. 2013-154671

(51) Int. Cl.
*G01L 3/02* (2006.01)
*B62D 6/10* (2006.01)
*G01L 3/10* (2006.01)

(52) U.S. Cl.
CPC .. *G01L 3/101* (2013.01); *B62D 6/10* (2013.01)
USPC ....................... 73/862.193; 73/862

(58) Field of Classification Search
USPC ................................... 73/862.193
See application file for complete search history.

(56) References Cited

U.S. PATENT DOCUMENTS

| 2002/0124663 A1* | 9/2002 | Tokumoto et al. ........ 73/862.333 |
| 2008/0116881 A1* | 5/2008 | May .......................... 324/207.12 |
| 2009/0078058 A1 | 3/2009 | Aoki et al. |
| 2010/0242627 A1* | 9/2010 | Okuyama et al. ........ 73/862.335 |
| 2010/0253253 A1* | 10/2010 | Yasuda ..................... 318/400.04 |
| 2013/0192390 A1* | 8/2013 | Shidahara et al. ....... 73/862.325 |
| 2013/0263654 A1* | 10/2013 | Pietron et al. ............. 73/115.02 |

FOREIGN PATENT DOCUMENTS

| JP | 2008-232728 | 10/2008 |
| JP | 2012-251809 | 12/2012 |

* cited by examiner

*Primary Examiner* — Lisa Caputo
*Assistant Examiner* — Jamel Williams
(74) *Attorney, Agent, or Firm* — Nixon & Vanderhye PC

(57) ABSTRACT

A torque sensor has a magnetic sensor, which is composed of a first magnetic detecting element, a second magnetic detecting element and a comparator. The first magnetic detecting element outputs an output signal of a provisional detection value, while the second magnetic detecting element outputs an output signal of a reference value. The comparator compares the provisional detection value and the reference value and outputs the provisional detection value as an authorized detection value, when a difference value between the provisional detection value and the reference value is smaller than a predetermined threshold value.

9 Claims, 10 Drawing Sheets

COMPARISON EXAMPLE

TORQUE SENSOR

CROSS REFERENCE TO RELATED APPLICATION

This application is based on Japanese Patent Applications No. 2012-251304 filed on Nov. 15, 2012, and No. 2013-154671 filed on Jul. 25, 2013, the disclosures of which are incorporated herein by reference.

FIELD OF TECHNOLOGY

The present disclosure relates to a magnetic detecting device having a magnetic-field generating member and a magnetic sensor, and in particular, to a torque sensor having the above magnetic detecting device.

BACKGROUND

A magnetic detecting device is known in the art. The magnetic detecting device has a magnetic-field generating means and a magnetic sensor. The magnetic sensor detects intensity of magnetic field generated by the magnetic-field generating means, which is movably provided relative to the magnetic sensor. The magnetic sensor detects a relative displacement of a detection subject, which is connected to either the magnetic-field generating means or the magnetic sensor.

This kind of magnetic detecting device is applied to, for example, a torque sensor. A magnetic sensor of the torque sensor is provided between a pair of magnetic-flux collecting members so as to detect a change of intensity of the magnetic field in accordance with rotation of a rotational shaft. The torque sensor thereby detects a shaft torque.

Another magnetic detecting device is also known in the art, according to which the detecting device has multiple magnetic sensors. When one of the magnetic sensors becomes out of order, a detection signal from another one of the magnetic sensors, which works in a normal condition, is used. For example, as disclosed in Japanese Patent Publication No. 2008-232728, a torque sensor has three magnetic sensors for transmitting each of outputs from those magnetic sensors to an electronic control unit (the ECU). The ECU compares the outputs from those three magnetic sensors and decides the outputs as normal values based on a majority decision, when two of the three outputs from the magnetic sensors coincide with each other.

In the above torque sensor, a circuit size is increased because of three magnetic sensors.

Generally, one magnetic sensor has one IC package, to which a wire harness having a power-supply line, a ground line and a signal line is connected. Therefore, in the above torque sensor, three wire harnesses are provided between the torque sensor and the ECU, when the torque sensor is of an analogue-type. As a result, space and weight for the wire harnesses are increased, when compared with a case in which the torque sensor has only one or two magnetic sensors.

In addition, although the torque sensor of the above prior art has an advantage that it is possible to determine whether the magnetic sensor becomes out of order, it is a problem that calculation load of the ECU for carrying out a process of determining the faulty magnetic sensor is increased.

SUMMARY OF THE DISCLOSURE

The present disclosure is made in view of the above problem. It is an object of the present disclosure to provide a magnetic detecting device, according to which a circuit size and a number of wire harnesses can be reduced and it is possible with a simple structure to determine failure of a magnetic sensor.

According to a feature of the present disclosure, a magnetic detecting device has a magnetic-field generating member for generating a magnetic field and a magnetic sensor for detecting intensity of the magnetic field generated by the magnetic-field generating member. The magnetic sensor has a first magnetic detecting element, a second magnetic detecting element and a comparator.

The first detecting element detects density of magnetic flux passing through the first detecting element and outputs an output signal of a provisional detection value. The second detecting element detects density of magnetic flux passing through the second detecting element and outputs an output signal of a reference value.

The comparator calculates a detection deviation, which is a difference value between the provisional detection value and the reference value. The comparator outputs a detection signal of an authorized detection value corresponding to the provisional detection value when the detection deviation is smaller than a predetermined threshold value. The comparator outputs an abnormal determination signal when the detection deviation is larger than the predetermined threshold value.

According to the above feature, it is possible to determine by the comparator, inside of the magnetic detecting device, whether the magnetic sensor is out of order. The magnetic detecting device outputs the authorized detection value when the magnetic sensor is operating in a normal condition, while the magnetic detecting device outputs the abnormal determination signal when the magnetic sensor is out of order. Therefore, it is not necessary for the ECU connected to the magnetic detecting device to carry out a process for the determination of a faulty magnetic sensor. The calculation load for the ECU is thereby reduced.

The magnetic detecting device preferably has multiple magnetic sensors. For example, when one of the magnetic sensors becomes out of order, the ECU adopts a detection signal of the authorized detection value from the other of the magnetic sensors and uses it for a control process of the ECU.

In the present disclosure, two wire harnesses are provided between two magnetic sensors and the ECU. It is, therefore, possible to reduce the space and weight for the wire harnesses, compared with the prior art torque sensor which has three magnetic sensors.

The magnetic detecting device of the present disclosure can be applied to, for example, a torque sensor for detecting a shaft torque. The torque sensor has a torsion bar, a multipolar magnet, a pair of magnetic yokes, a pair of magnetic-flux collecting members, and a magnetic sensor.

The torsion bar is coaxially provided between a first shaft and a second shaft, so that the torsion bar converts a torque applied between the first and the second shafts into a torsional displacement. The multipolar magnet working as the magnetic-field generating member is connected to either the first shaft or one end of the torsion bar. The pair of magnetic yokes is connected to either the second shaft or the other end of the torsion bar, and the pair of the magnetic yokes forms a magnetic circuit in the magnetic field generated by the multipolar magnet. The pair of magnetic-flux collecting members collects the magnetic flux from the pair of the magnetic yokes. The magnetic sensor detects the intensity of the magnetic field between the magnetic-flux collecting members.

In an electric power steering system for a vehicle, the torque sensor detects a steering torque applied to a steering shaft. There is a demand for the electric power steering system to reduce its space and weight. The present disclosure has an advantage that it is possible to determine with a simple structure whether the magnetic sensor is out of order. Therefore, the magnetic detecting device of the present disclosure can be effectively applied to the torque sensor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
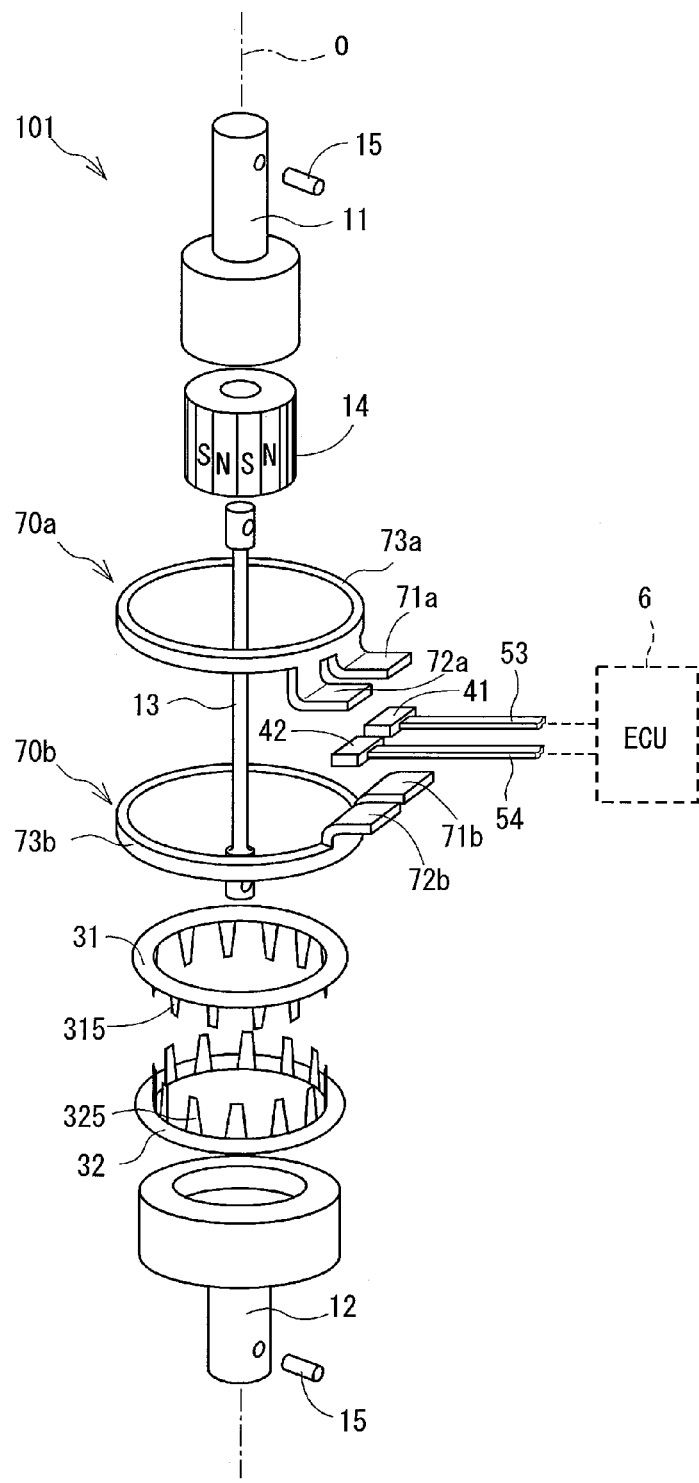
FIG. 1 is an exploded perspective view schematically showing a torque sensor according to a first embodiment of the present disclosure.

The present disclosure will be explained hereinafter by way of multiple embodiments. The same reference numerals are given to the same or similar portions and/or structures throughout the embodiments, for the purpose of eliminating repeated explanation.

First Embodiment

Figure 2:
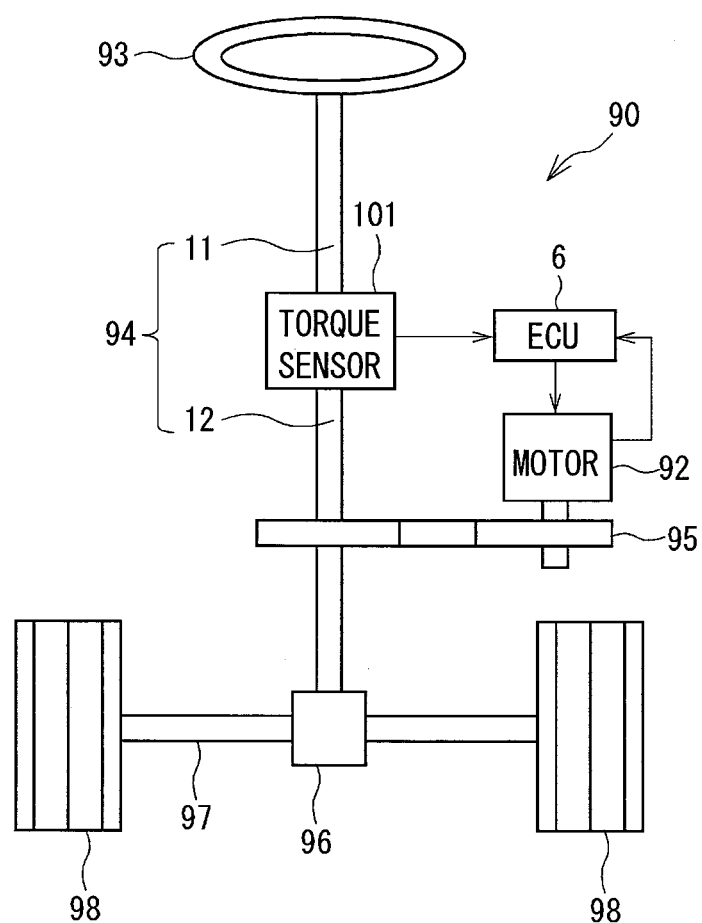
FIG. 2 is an outlined view showing a structure of an electric power steering apparatus, to which the torque sensor of the first embodiment is applied.

As shown in FIG. 2, a torque sensor 101 of a first embodiment of the present disclosure is applied to, for example, an electric power steering apparatus 90 for a vehicle for assisting a steering operation of a vehicle driver.

FIG. 2 shows a structure for a steering system having the electric power steering apparatus 90. The torque sensor 101 for detecting a steering torque is provided in a steering shaft 94 connected to a steering wheel 93. A pinion gear 96 is provided at a forward end of the steering shaft 94. The pinion gear 96 is engaged with a rack shaft 97. A pair of wheels 98 is rotatably connected to both ends of the rack shaft 97 via respective tie rods. A rotational movement of the steering shaft 94 is converted to a linear movement of the rack shaft 97 by the pinion gear 96, so that the steering operation of the wheels 98 is carried out.

The torque sensor 101 is provided between an input shaft 11 and an output shaft 12, each of which constitutes the steering shaft 94. The torque sensor 101 detects the steering torque applied to the steering shaft 94 and outputs its detection signal to an electronic control unit 6 (the ECU 6). The ECU 6 controls an output of an electric motor 92 depending on the detected steering torque. A steering assist torque generated by the electric motor 92 is transmitted to the steering shaft 94 via a speed-reduction gear 95, which reduces a rotational speed of the electric motor 92.

A structure of the torque sensor 101 will be explained with reference to FIG. 1 and FIGS. 3 to 5. As shown in FIG. 1, the torque sensor 101 is composed of a torsion bar 13, a multipolar magnet 14, a pair of magnetic yokes 31 and 32 (the first and the second magnetic yokes 31 and 32), a pair of magnetic rings 70a and 70b (the first and second magnetic rings 70a and 70b, or the first and second magnetic-flux collecting members 70a and 70b), two magnetic sensors 41 and 42 (the first and second magnetic sensors 41 and 42), and so on.

One end of the torsion bar 13 is connected to the input shaft 11 (also referred to as a first shaft) by a fixing pin 15, while the other end of the torsion bar 13 is connected to the output shaft 12 (also referred to as a second shaft) by another fixing pin 15. The torsion bar 13 is coaxially connected to the input and output shafts 11 and 12 on a rotational axis "O" thereof. The torsion bar 13 is a rod-shaped elastic member for converting the steering torque of the steering shaft 94 into a torsional displacement.

The multipolar magnet 14 of a cylindrical shape (working as a magnetic-field generating means) is connected to the input shaft 11, wherein N-poles and S-poles are alternately magnetized in a circumferential direction. In the present embodiment, the magnet 14 has 12 pairs of N-poles and S-poles, namely, 24 poles in total.

Each of the first and second magnetic yokes 31 and 32 is made of soft magnetic material and formed in an annular shape. The magnetic yokes 31 and 32 are connected to the output shaft 12 at a radial-outward position of the multipolar magnet 14. First twelve projections 315 (corresponding to the number of the pairs of N-pole and S-pole) are formed along an inner periphery of the first magnetic yoke 31 and arranged at equal intervals in a circumferential direction of the first yoke 31. In a similar manner, second twelve projections 325 are formed along an inner periphery of the second magnetic yoke 32 and arranged at equal intervals in a circumferential direction of the second yoke 32. Each of the first projections 315 and each of the second projections 325 are alternately arranged in the circumferential direction and displaced from each other in the circumferential direction. Each of the first and second projections 315 and 325 is formed in a trapezoidal shape. The first magnetic yoke 31 and the second magnetic yoke 32 are opposed to each other in an axial direction of the torque sensor with air gap. The pair of magnetic yokes 31 and 32 forms a magnetic circuit in a magnetic field generated by the multipolar magnet 14.

When the torsional displacement is not generated in the torsion bar 13, in other words, when the steering torque is not applied to the torsion bar 13 between the input shaft 11 and the output shaft 12, the multipolar magnet 14 and the first and second magnetic yokes 31 and 32 are so positioned that each of center lines for the first and second projections 315 and 325 coincides with respective boundary lines between the N-poles and the S-poles.

Each of the first and second magnetic rings 70a and 70b is made of soft magnetic material and composed of a main ring body 73a, 73b and magnetic-flux collecting portions 71a, 72a, 71b and 72b. Each of the magnetic-flux collecting portions 71a, 72a, 71b and 72b extends in a radial-outward direction from the respective main ring bodies 73a and 73b. Each of the magnetic rings 70a and 70b collects magnetic flux from the respective magnetic yokes 31 and 32. In the present embodiment, each of the main ring bodies 73a and 73b of the magnetic rings 70a and 70b is coaxially arranged with the rotational axis "O" at a radial-outward position of the respective magnetic yokes 31 and 32. Two magnetic-flux collecting portions 71a, 72a and 71b, 72b are provided in each of the magnetic rings 70a and 70b, so as to correspond to the two magnetic sensors 41 and 42.

Each of the magnetic sensors 41 and 42 is arranged between the magnetic-flux collecting portions 71a, 71b and 72a, 72b of the magnetic rings 70a and 70b. Each of the magnetic sensors 41 and 42 detects magnetic-flux density generated between the respective pairs of the magnetic-flux collecting portions 71a, 71b and 72a, 72b. The detected magnetic-flux density is converted into electrical voltage signal and outputted to the ECU 6. In the present embodiment, each of the magnetic sensors 41 and 42 is made of an IC package formed in a cuboid shape, wherein a height is smaller than a width and a depth thereof. The magnetic sensors 41 and 42 detect intensity of the magnetic field in a height direction. The magnetic sensors 41 and 42 are connected to the ECU 6 via wire harnesses 53 and 54.

Detailed structure of the magnetic sensors 41 and 42 will be explained below.

Figure 3A:
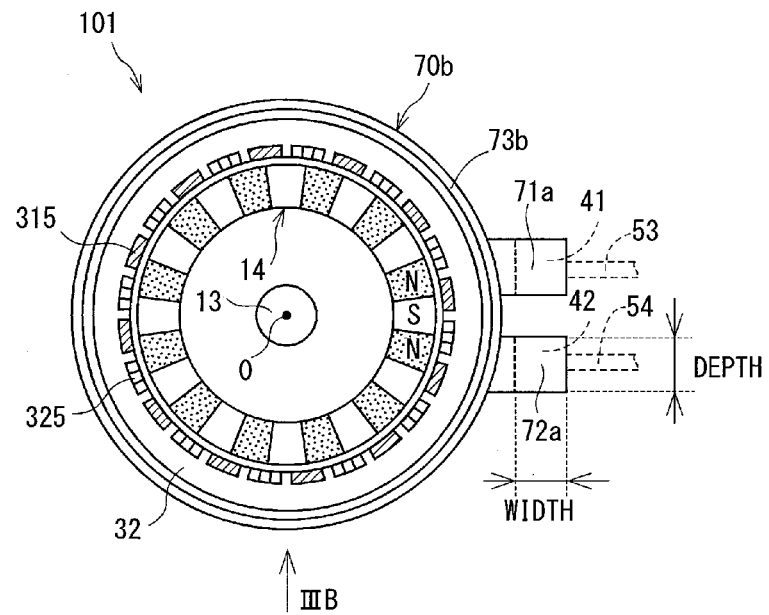
FIG. 3A is a schematic cross sectional view, taken along a line IIIA-IIIA in FIG. 3B, showing the torque sensor which is in a neutral position.
Figure 3B:
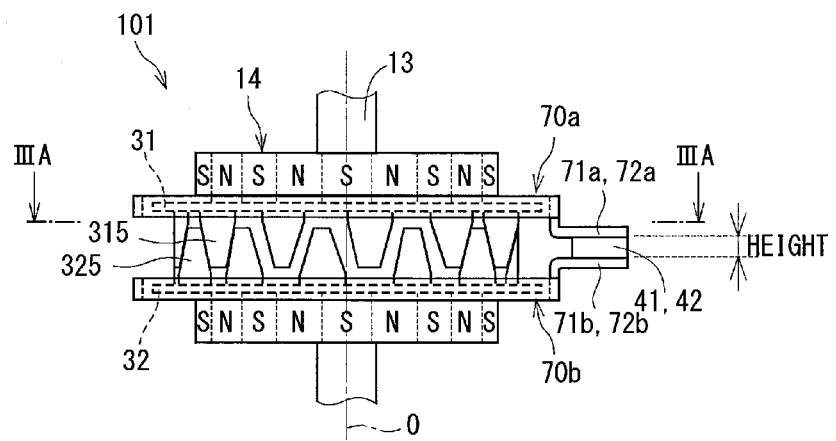
FIG. 3B is a schematic side view of the torque sensor, when viewed in a direction of an arrow IIIB in FIG. 3A.

An operation of the torque sensor 101 will be explained with reference to FIGS. 3A, 3B, 4A and 4B. Each of FIGS. 3A and 3B shows a condition that the steering torque is not applied to the torsion bar 13 between the input shaft 11 and the output shaft 12 and therefore no torsional displacement is generated at the torsion bar 13. In other words, in FIGS. 3A and 3B, the output shaft 12 is in its neutral position. In this position, as shown in FIG. 3B, the S-pole is located at a center of the multipolar magnet 14. In addition, each of the center lines of the first and second projections 315 and 325 coincides with the respective boundary lines between the N-poles and the S-poles.

In the above condition (the neutral position), the same number of the magnetic fluxes of the magnet 14 goes in to and out from the first and the second projections 315 and 325 of the magnetic yokes 31 and 32. Therefore, in each of the magnetic yokes 31 and 32, a closed loop of the magnetic flux is formed. In other words, the magnetic flux does not leak into the air gaps between the first and second magnetic yokes 31 and 32. As a result, the density of the magnetic flux, which is detected by the magnetic sensors 41 and 42, is zero.

In FIGS. 3A and 3B, a length of each magnetic sensor 41, 42 in a horizontal direction of FIG. 3A is referred to as a width, a length in an up-and-down direction of FIG. 3A is referred to as a depth, and a length in an up-and-down direction of FIG. 3B is referred to as a height.

Figure 4A:
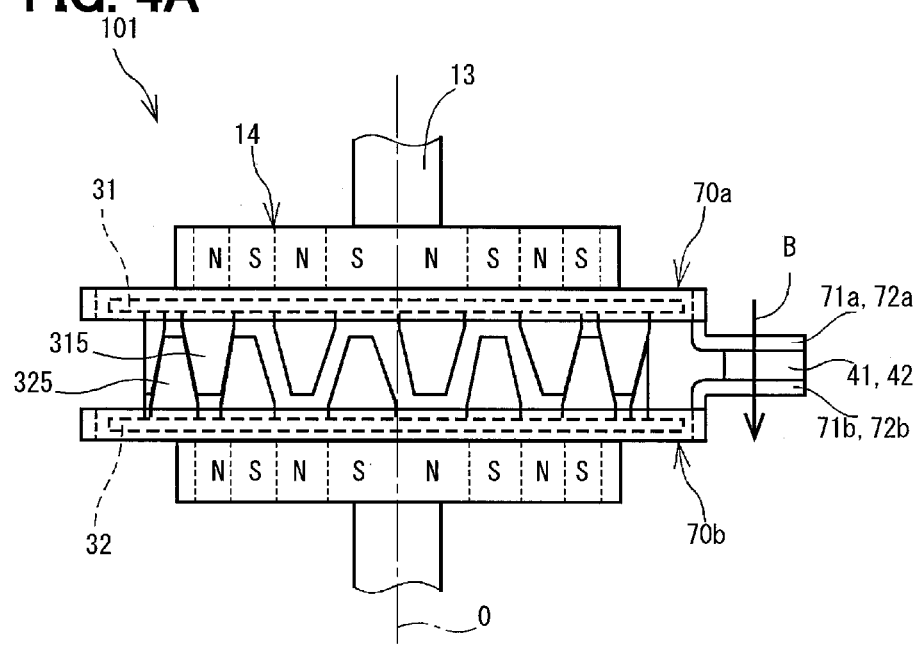
FIG. 4A is a schematic side view of the torque sensor, in which multiple magnetic poles are rotated in a left-hand direction.
Figure 4B:
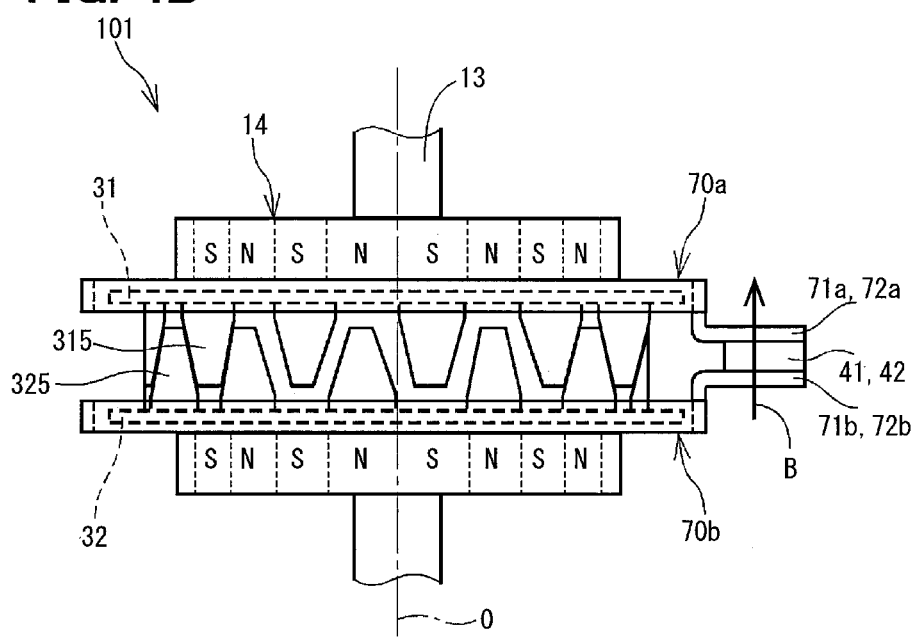
FIG. 4B is a schematic side view of the torque sensor, in which multiple magnetic poles are rotated in a right-hand direction.

When the steering torque is applied to the torsion bar 13 between the input shaft 11 and the output shaft 12 and thereby the torsional displacement is generated in the torsion bar 13, a relative position between the multipolar magnet 14 connected to the input shaft 11 and the pair of magnetic yokes 31 and 32 connected to the output shaft 12 is changed in the circumferential direction. FIGS. 4A and 4B, respectively, show conditions that the multipolar magnet 14 is rotated relative to the pair of magnetic yokes 31 and 32 from the neutral position. FIG. 4A shows the condition that the multipolar magnet 14 is rotated in the left-hand direction by 7.5°. FIG. 4B shows the condition that the multipolar magnet 14 is rotated in the right-hand direction by 7.5°.

In the condition of FIG. 4A, each of the first projections 315 of the first magnetic yoke 31 opposes to each N-pole, while each of the second projections 325 of the second magnetic yoke 32 opposes to each S-pole. In the condition of FIG. 4B, each of the first projections 315 opposes to each S-pole, while each of the second projections 325 opposes to each N-pole. The magnetic flux passing through the first and the second magnetic yokes 31 and 32 is increased in each of the cases of FIGS. 4A and 4B, but directions of the magnetic flux (that is, polarities) are opposite to each other in the cases of FIGS. 4A and 4B.

The density of the magnetic flux passing through the magnetic sensors 41 and 42 are almost proportional to an amount of the torsional displacement of the torsion bar 13 and the polarity of the magnetic flux is reversed depending on a torsional direction of the torsion bar 13. In the case of FIG. 4A, the magnetic sensors 41 and 42 detect the intensity of the magnetic field B, in which the magnetic flux passes in the height direction of the magnetic sensors, that is, in a direction from an up-side to a down-side in the drawing. On the other hand, in the case of FIG. 4B, the magnetic sensors 41 and 42 detect the intensity of the magnetic field B, in which the magnetic flux passes in the height direction of the magnetic sensors, that is, in a direction from the down-side to the up-side in the drawing. In other words, each of the magnetic sensors 41 and 42 detects the intensity of the magnetic field B passing through the magnetic sensors in a direction perpendicular to the magnetic-flux collecting portions 71a, 71b and 72a, 72b. The magnetic sensors 41 and 42 output the detected intensity of the magnetic field as the electrical voltage signals, in order that the torque sensor 101 detects the steering torque applied to the torsion bar 13 between the input shaft 11 and the output shaft 12.

As above, the torque sensor 101 corresponds to a detecting device, which detects a direction of the relative rotation and a rotational angle of the input shaft 11 connected to the multipolar magnet 14 relative to the output shaft 12 connected to the magnetic sensors 41 and 42.

Figure 5:
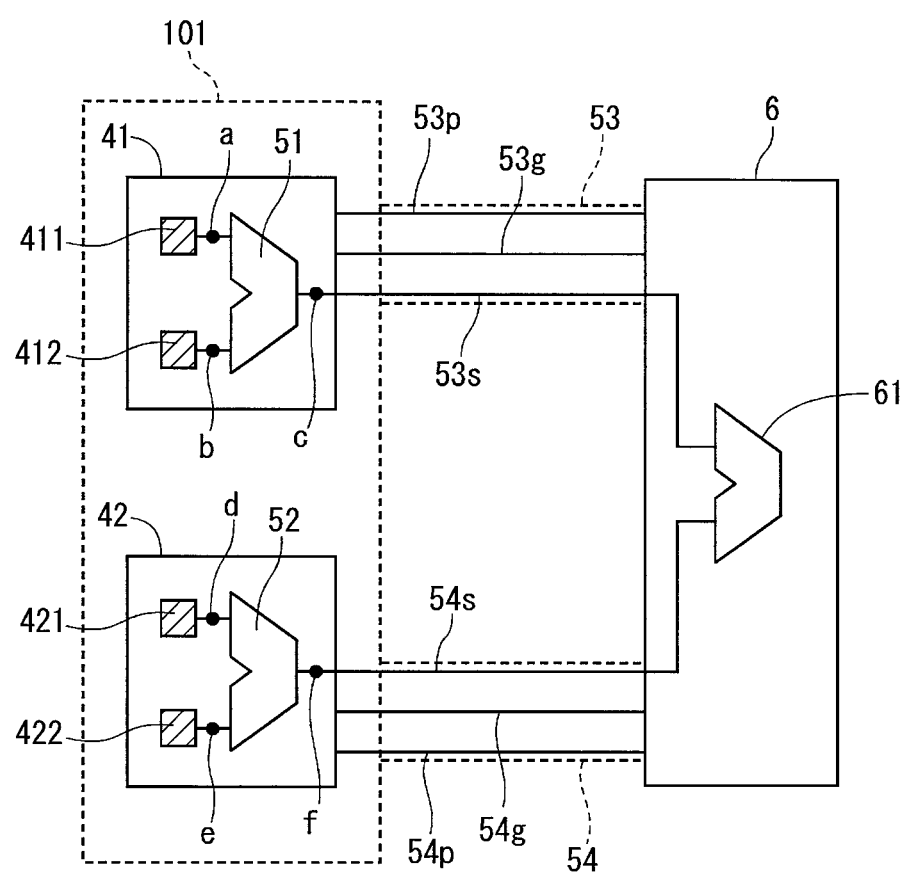
FIG. 5 is a schematic view showing a magnetic sensor portion of the torque sensor.

A structure of a magnetic sensing portion of each magnetic sensor 41, 42 will be explained with reference to FIG. 5. As already explained, the torque sensor 101 has two magnetic sensors 41 and 42. Since the structure of the second magnetic sensor 42 is the same to that of the first magnetic sensor 41, the structure of the first magnetic sensor 41 will be explained.

The magnetic sensor 41 has two (first and second) magnetic detecting elements 411 and 412 and a comparator 51, which are accommodated in the IC package. Each of the magnetic detecting elements 411 and 412 detects the density of the magnetic flux passing through the respective magnetic detecting elements 411 and 412 and converts into the electrical voltage signal. Each of the magnetic detecting elements is made of, for example, a hall element, a magnetic resistance element or the like.

One of the magnetic detecting elements (for example, the first magnetic detecting element 411) outputs the electrical voltage signal, which is used as the detection signal of the first magnetic sensor 41. The detection signal (the detection value) of the first magnetic sensor 41 is transmitted to the ECU 6. The second magnetic detecting element 412 outputs the electrical voltage signal, which is used as a reference value. The reference value of the second magnetic detecting element 412 is compared at the comparator 51 with the detection value of the first magnetic detecting element 411. As above, the detection value of the first magnetic detecting element 411 is not directly outputted to the ECU 6, but at first compared at the comparator 51 with the reference value and then outputted to the ECU 6 when the magnetic sensor 41 determines that the detection value is a normal value.

Each of the electrical voltage signals from the magnetic detecting elements 411 and 412 to the comparator 51 is also referred to as a primary output signal, while the output from the comparator 51 to the ECU 6 is also referred to as a secondary output signal, so as to differentiate one from the other. The primary output signals are communicated within the first magnetic sensor 41. The secondary output signal is transmitted to the ECU 6 via a signal line 53s of the wire harness 53. The wire harness 53 includes three lines, that is, a power-supply line 53p, a ground line 53g and the signal line 53s.

The detection value of the first magnetic detecting element 411, which corresponds to a value before the comparison at the comparator 51 (that is, a value before the determination), is referred to as a provisional detection value. The detection value of the first magnetic detecting element 411, which corresponds to a value after the comparison at the comparator 51 (that is, a value determined by the comparator 51 as the normal value and outputted to the ECU 6), is referred to as an authorized detection value.

The comparator 51 calculates "a detection deviation", which is a difference value between the provisional detection value (the primary output signal of the first magnetic detecting element 411) and the reference value of the second magnetic detecting element 412. When the detection deviation is smaller than a predetermined threshold value, the comparator 51 outputs the provisional detection value as the authorized detection value. On the other hand, when the detection deviation is larger than the predetermined threshold value, the comparator 51 outputs an abnormal detection signal.

As above, the output signal (the authorized detection value) of the magnetic sensor 41, which is determined by the comparator 51 as the normal value, is inputted to a calculation unit 61 of the ECU 6. It is, therefore, not necessary that the ECU 6 determines whether the inputted signal is a normal value or not, when the normal value is inputted. The ECU 6 can use the normal value for the detection value of the magnetic sensor 41 so as to carry out the control by the ECU 6. When the abnormal detection signal is inputted to the ECU 6, the ECU 6 determines that the magnetic sensor 41 is out of order.

In a similar manner, the output signal (the authorized detection value) of the second magnetic sensor 42, which is determined by a comparator 52 as the normal value, is inputted to the calculation unit 61 of the ECU 6. When the abnormal detection signal is inputted from the first magnetic sensor 41, while the authorized detection value is inputted from the second magnetic sensor 42, the calculation unit 61 of the ECU 6 adopts the authorized detection value from the second magnetic sensor 42 in order to carry out the control by the ECU 6.

Since the torque sensor 101 has two magnetic sensors 41 and 42, the ECU 6 can continuously carry out the control for the electric motor 92 even when one of the magnetic sensors 41 and 42 becomes out of order. There is a very little probability that two magnetic sensors 41 and 42 become out of order at the same time.

In each of the wire harnesses 53 and 54 for connecting the magnetic sensors 41 and 42 to the ECU 6, the power-supply lines 53p and 54p are independently arranged from each other. The ground lines 53g and 54g are also independently arranged from each other.

An operation of a determination process at the comparators 51 and 52 will be explained more in detail with reference to output characteristics shown in FIGS. 6A and 6B, wherein the output corresponds to the electrical voltage signal.

Figure 6A:
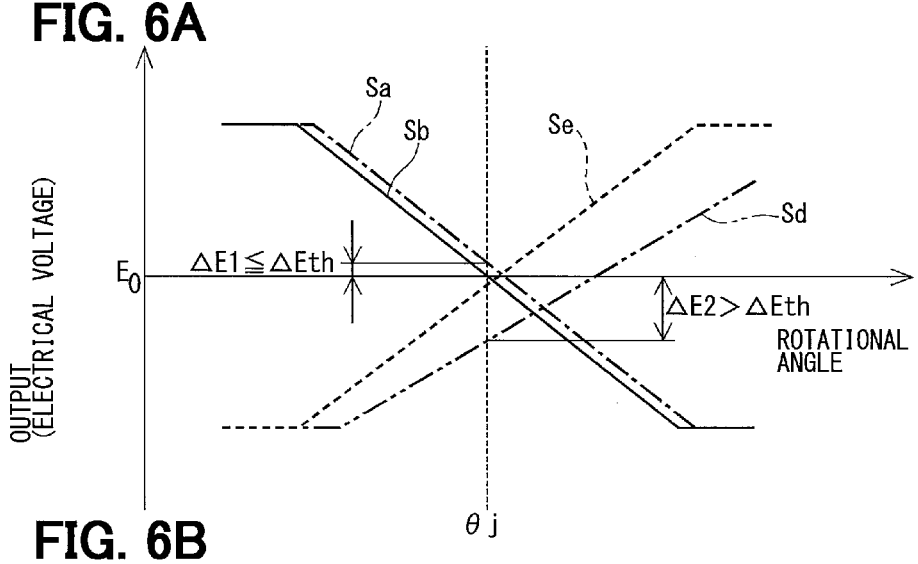
FIGS. 6A and 6B are graphs showing output characteristics of the torque sensor.

In FIG. 6A, "Sa", "Sb", "Sd" and "Se" respectively indicate primary output signals at an output terminal "a" of the first magnetic detecting element 411 of the first magnetic sensor 41, at an output terminal "b" of the second magnetic detecting element 412 of the first magnetic sensor 41, at an output terminal "d" of a first magnetic detecting element 421 of the second magnetic sensor 42, and at an output terminal "e" of a second magnetic detecting element 422 of the second magnetic sensor 42. The primary output signals of the respective first magnetic detecting elements 411 and 421 correspond to the provisional detection values. The primary output signals of the respective second magnetic detecting elements 412 and 422 correspond to the reference values.

In the example shown in FIG. 6A, the first and second magnetic sensors 41 and 42 are so set that the output characteristics "Sa" and "Sb" of the magnetic detecting elements 411 and 412 and the output characteristics "Sd" and "Se" of the magnetic detecting elements 421 and 422 are opposite to each other with respect to a reference output "E0".

More exactly, in a case that the IC packages are so assembled in the respective magnetic sensors 41 and 42 that each of the IC packages is arranged in the same direction, a sign for a slope of the voltage output with respect to the magnetic flux is reversed for the outputs of the magnetic detecting elements 421 and 422 of the second magnetic sensor 42 in a calculation process by the calculation unit 61 of the ECU 6. Then, the output characteristics for the magnetic detecting elements 421 and 422 of the second magnetic sensor 42 are reversed with respect to the reference output "E0".

Figure 6B:
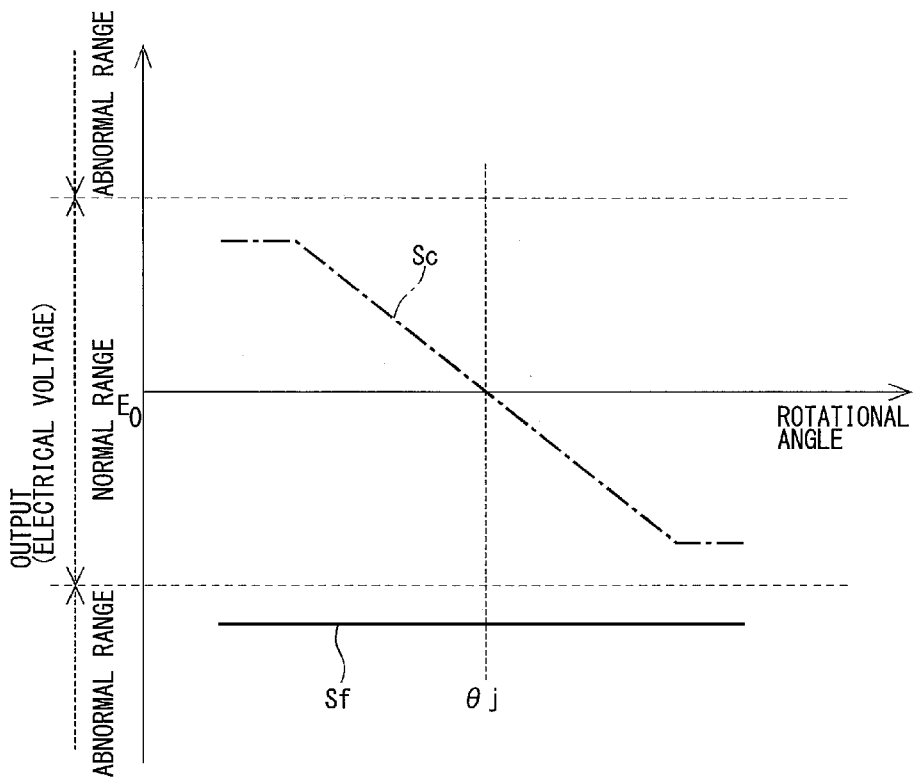
Figure 7:
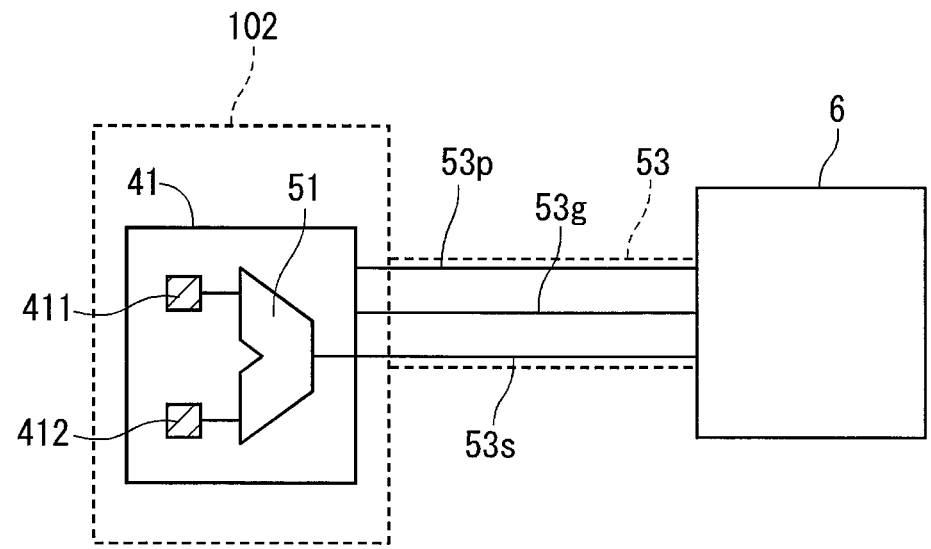
FIG. 7 is a schematic view showing a magnetic sensor portion of a torque sensor according to a second embodiment.

In FIG. 6B, "Sc" and "Sf" respectively indicate secondary output signals at an output terminal "c" of the comparator 51 and an output terminal "f" of the comparator 52

At an optional rotational angle "θj" for the determination, the comparator 51 calculates "the detection deviation", which is the difference value between the provisional detection value "Sa" of the first magnetic detecting element 411 and the reference value "Sb" of the second magnetic detecting element 412. In a similar manner, at the optional rotational angle "θj" for the determination, the comparator 52 calculates "the detection deviation", which is the difference value between the provisional detection value "Sd" of the first magnetic detecting element 421 and the reference value "Se" of the second magnetic detecting element 422. Each of the comparators 51 and 52, respectively, compares the above "detection deviation" with a predetermined threshold value "ΔEth". The above optional rotational angle "θj" for the determination corresponds to an angle optionally selected and used for the control of the ECU 6.

As shown in FIG. 6A, the detection deviation "ΔE1", which is calculated by the comparator 51 as the difference value for the first magnetic sensor 41 between the provisional detection value "Sa" of the first magnetic detecting element 411 and the reference value "Sb" of the second magnetic detecting element 412, is smaller than the threshold value "ΔEth". In other words, the provisional detection value "Sa" and the reference value "Sb" almost coincide with each other. In this case, the comparator 51 outputs the provisional detection value "Sa" of the first magnetic detecting element 411 to the calculation unit 61 of the ECU 6 as the authorized detection value "Sc" (shown in FIG. 6B), which is the electrical voltage signal within a normal output range.

On the other hand, as shown in FIG. 6A, the detection deviation "ΔE2", which is calculated by the comparator 52 as the difference value for the second magnetic sensor 42 between the provisional detection value "Sd" of the first magnetic detecting element 421 and the reference value "Se" of the second magnetic detecting element 422, is larger than the threshold value "ΔEth". In this case, the comparator 52 outputs the abnormal determination signal "Sf" to the calculation unit 61 of the ECU 6, wherein the abnormal determination signal "Sf" is the electrical voltage signal out of the normal output range, as shown in FIG. 6B.

Then, the ECU 6 determines that the first magnetic sensor 41 is normal but the second magnetic sensor 42 is abnormal. The ECU 6 uses the authorized detection value "Sc" from the first magnetic sensor 41 for its own control process.

Advantages of the torque sensor 101 according to the present embodiment will be explained.

Figure 9:
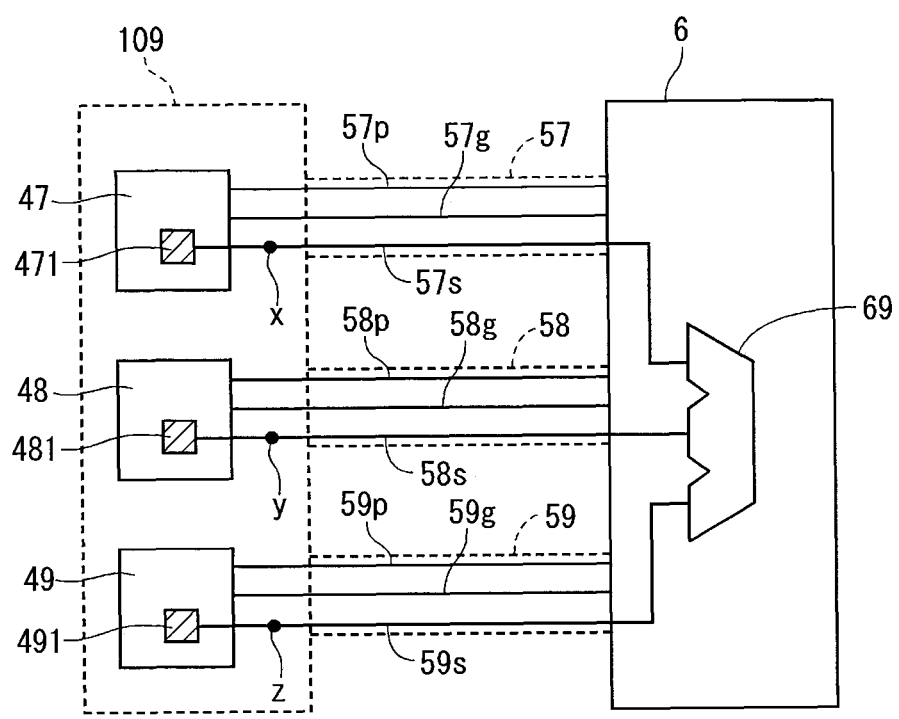
FIG. 9 is a schematic view showing a magnetic sensor portion of a torque sensor according to a comparison example.
Figure 10:
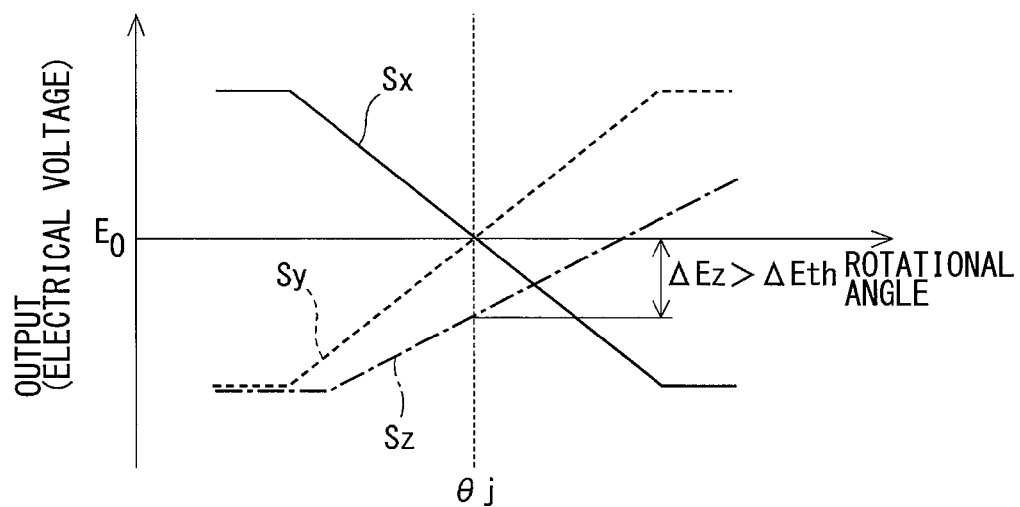
FIG. 10 is a graph showing output characteristics of the torque sensor according to the comparison example.

(1) At first, the present embodiment is compared with a torque sensor shown in FIGS. 9 and 10, which corresponds to the prior art torque sensor disclosed in JP Patent Publication No. 2008-232728. A torque sensor 109 of a comparison example shown in FIG. 9 has three magnetic sensors 47, 48 and 49. Each of the magnetic sensors 47, 48 and 49 has a magnetic detecting element 471, 481, 491, which is respectively connected to the ECU6 via a wire harness 57, 58, 59. Each of the wire harnesses 57, 58 and 59 includes a power-supply line 57p, 58p, 59p, a ground line 57g, 58g, 59g and a signal line 57s, 58s, 59s. The output of each magnetic sensor is transmitted to a calculation unit 69 of the ECU 6 via the respective signal line 57s, 58s, 59s.

FIG. 10 shows output characteristics of the torque sensor 109 of the comparison example. In FIG. 10, "Sx", "Sy" and "Sz" respectively indicate output voltages at an output terminal "x" of the magnetic detecting element 471, at an output terminal "y" of the magnetic detecting element 481 and at an output terminal "z" of the magnetic detecting element 491. In the comparison example shown in FIGS. 9 and 10, the magnetic sensors 47, 48 and 49 are so set that the output characteristics "Sx" of the magnetic detecting element 471 and the output characteristics "Sy" and "Sz" of the magnetic detecting elements 481 and 491 are opposite to each other with respect to the reference output "E0".

At the rotational angle "θj" for the determination, the output voltage "Sx" of the magnetic detecting element 471 and the output voltage "Sy" of the magnetic detecting element 481 coincide with the reference output "E0". However, with regard to the output voltage "Sz" of the magnetic detecting element 491, a deviation "ΔEz" from the reference output "E0" is larger than the predetermined threshold value "ΔEth". As a result, the ECU 6 determines that the magnetic sensors 47 and 48 are normal but the magnetic sensor 49 is abnormal. The ECU 6 adopts the output voltages from the magnetic sensors 47 and 48 as authorized values and uses those output voltages for its own control process.

Therefore, it is possible in the torque sensor 109 of the comparison example to determine whether the magnetic sensor is out of order or not. However, since it is necessary to provide three magnetic sensors 47, 48 and 49, a circuit size is increased. In addition, since three wire harnesses 57, 58 and 59 are connected between the torque sensor 109 and the ECU 6, space for the wire harnesses and weight of the torque sensor are increased. Furthermore, calculation load for the calculation unit 69 of the ECU 6 is increased.

According to the present embodiment, however, it is possible to determine at the comparators 51 and 52 (within of the torque sensor 101) whether any one of the magnetic sensors 41 and 42 is out of order or not. In addition, each of the magnetic sensors 41 and 42 outputs the authorized detection value or the abnormal determination signal to the ECU 6, depending on the condition of each magnetic sensor whether it is out of order or not. Therefore, it is not necessary for the ECU 6 to carry out a process for determining whether the magnetic sensor is normal or abnormal. The calculation load for the ECU 6 is thereby reduced.

In addition, since only two wire harnesses are necessary between the torque sensor 101 and the ECU 6, the space and weight for the wire harnesses can be reduced when compared with the comparison example, in which three wire harnesses are necessary.

(2) According to the torque sensor 101 of the present embodiment, the first magnetic detecting element 411 for outputting the detection signal, the second magnetic detecting element 412 for outputting the reference signal and the comparator 51 are accommodated in one IC package 41 (the first magnetic sensor 41). In a similar manner, the first magnetic detecting element 421 for outputting the detection signal, the second magnetic detecting element 422 for outputting the reference signal and the comparator 52 are accommodated in one IC package 42 (the second magnetic sensor 42). It is possible to collect the spaces for those parts in one IC package and make it easier to manage parts control in a manufacturing process.

(3) Since the torque sensor 101 of the present embodiment has multiple magnetic sensors 41 and 42, it is possible for the ECU 6 to continue the control (for the power steering operation) by using the authorized detection value from one of the magnetic sensors, when the other of the magnetic sensors becomes out of order. More exactly, in the electrical power steering apparatus, the steering assist torque (a command signal for the assisting torque) is calculated based on the detected torque amount applied to the steering shaft 94. A driving voltage for an inverter is controlled by such command signal, to thereby continue the operation of the electric motor 92. Accordingly, even when one of the magnetic sensors becomes out of order, the steering assist torque can be continuously applied to the steering shaft so that the vehicle driver can easily drive the vehicle to, for example, a nearest car dealership.

(4) According to the present embodiment, the power-supply lines 53p and 54p and the ground lines 53g and 54g are respectively arranged between the magnetic sensors 41 and 42 and the ECU 6, independently from each other. Since the electric potential for the power source as well as the electric potential for the ground level is common for the multiple magnetic sensors, it is possible to arrange one common power-supply line and one common ground line between the torque sensor 101 and the ECU 6, wherein the power-supply line and the ground line are bifurcated in the torque sensor 101 to the respective magnetic sensors 41 and 42.

However, when the power-supply lines and the ground lines are provided for the respective magnetic sensors, as in the present embodiment, it is possible to continue the control for the power steering operation even when one of the power-supply lines or one of the ground lines is disconnected.

Second Embodiment

According to a torque sensor 102 of a second embodiment, only one magnetic sensor 41, which is substantially the same to that of the first embodiment, is provided. In a case that it is not necessary to continue the control by the ECU when the magnetic sensor 41 becomes out of order, two magnetic sensors are not always necessary. Since the ECU 6 does not require the calculation unit 61 in the second embodiment, the calculation load for the ECU 6 can be further reduced.

Third Embodiment

Figure 8:
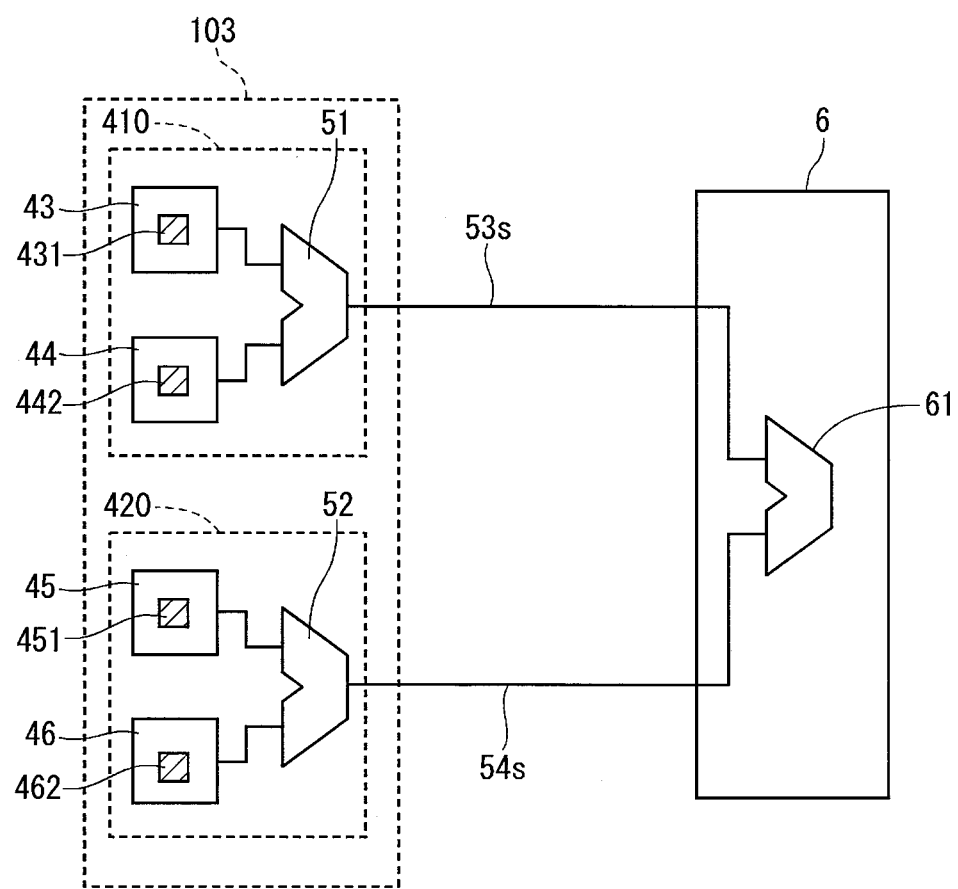
FIG. 8 is a schematic view showing a magnetic sensor portion of a torque sensor according to a third embodiment.

A torque sensor 103 of a third embodiment shown in FIG. 8 differs from that of the first embodiment in a structure for IC packages accommodating the magnetic detecting elements.

According to the third embodiment, each of magnetic detecting elements 431 and 442 (for the detection signal and for the reference signal) of a first magnetic sensor 410 is accommodated in respective IC packages 43 and 44. In a similar manner, each of magnetic detecting elements 451 and 462 (for the detection signal and for the reference signal) of a second magnetic sensor 420 is accommodated in respective IC packages 45 and 46. Each of the comparators 51 and 52 is provided in the respective magnetic sensors 41 and 42 independently from the IC packages 43, 44 and 45, 46.

Wire harnesses between the respective magnetic sensors 410 and 420 and the ECU 6 are the same to those of the first embodiment. However, in FIG. 8, only the signal lines 53s and 54s are indicated.

As shown in FIG. 8, the IC packages 43 and 44 and the comparator 51 constitute the first magnetic sensor 410, while the IC packages 45 and 46 and the comparator 52 constitute the second magnetic sensor 420. The magnetic sensors 410 and 420 have substantially the same functions to those of the magnetic sensors 41 and 42 of the first embodiment.

Each of the IC packages 43 to 46 (having the magnetic detecting elements) can magnetically detect the rotational direction and the rotational angle by itself. In this meaning, each of the IC packages 43 to 46 can be regarded as a magnetic sensor of a broader meaning.

However, the magnetic sensor of the present disclosure is defined as such having the magnetic detecting element for the detection signal, the magnetic detecting element for the reference signal and the comparator.

Further Embodiments and/or Modifications (A) In the above embodiments, the multipolar magnet 14 is connected to the input shaft 11, while the pair of magnetic yokes 31 and 32 is connected to the output shaft 12. However, the multipolar magnet 14 can be connected to the output shaft 12, while the pair of magnetic yokes 31 and 32 can be connected to the input shaft 11. Alternatively, the multipolar magnet 14 can be connected to one end of the torsion bar 13, while the pair of magnetic yokes 31 and 32 can be connected to the other end of the torsion bar 13.

(B) The shape of the magnetic-flux collecting members 70a and 70b should not be limited to the annular shape. The magnetic-flux collecting members may be formed in a semi-circular shape.

(C) The present disclosure should not be limited to the torque sensor for the electric power steering apparatus. The present disclosure can be applied to various kinds of detecting devices, which have a magnetic-flux generating means and a magnetic sensor, wherein the magnetic-flux generating means and the magnetic sensor are relatively rotatable to each other and a relative displacement of a member connected to either one of the magnetic-flux generating means and the magnetic sensor is detected.

For example, the present disclosure may be applied to a micro-angle detecting sensor. Alternatively, the present disclosure may be applied to a rotational angle detecting sensor, in which the magnetic sensor is rotated relative to the magnetic-flux generating means and the magnetic sensor is rotated for an angular range larger than that of the micro-angle detecting sensor.

Furthermore, the present disclosure can be applied to a stroke sensor, in which a magnetic sensor is moved relative to a magnetic-flux generating means not in a rotating manner but in a linearly reciprocating manner.

As above, the present disclosure should not be limited to the above embodiments and/or modifications but can be modified in various manners without departing from spirit of the present disclosure.

What is claimed is:

1. A magnetic detecting device comprising:
a magnetic-field generating member for generating a magnetic field; and
a magnetic sensor movably provided relative to the magnetic-field generating member for detecting intensity of the magnetic field generated by the magnetic-field generating member,
wherein the magnetic detecting device detects a relative displacement of an detection object connected to either one of the magnetic-field generating member and the magnetic sensor, and
wherein the magnetic sensor comprises;
a first magnetic detecting element for detecting density of magnetic flux passing through the first magnetic detecting element and outputting an output signal of a provisional detection value;
a second magnetic detecting element for detecting density of magnetic flux passing through the second magnetic detecting element and outputting an output signal of a reference value; and
a comparator for calculating a detection deviation, which is a difference value between the provisional detection value and the reference value,
wherein the comparator outputs a detection signal of an authorized detection value corresponding to the provisional detection value when the detection deviation is smaller than a predetermined threshold value, while the comparator outputs an abnormal determination signal when the detection deviation is larger than the predetermined threshold value.

2. The magnetic detecting device according to claim 1, wherein
the first magnetic detecting element, the second magnetic detecting element and the comparator are accommodated in one IC package.

3. The magnetic detecting device according to claim 2, wherein
the IC package is so formed that a height is smaller than a width and a depth, and
each of the first magnetic detecting element and the second magnetic detecting element detects the density of magnetic flux passing through the respective first and second magnetic detecting elements in a height direction thereof.

4. The magnetic detecting device according to claim 1, wherein
the magnetic detecting device has multiple magnetic sensors.

5. The magnetic detecting device according to claim 4, wherein
each of the magnetic sensors has a signal line, a power-supply line and a ground line, and
the power-supply lines of the magnetic sensors are independently arranged from each other, and
the ground lines of the magnetic sensors are independently arranged from each other.

6. The magnetic detecting device according to claim 1, wherein
the detection signal of the authorized detection value is a voltage signal within a predetermined normal range, while the abnormal determination signal is a voltage signal out of the predetermined normal range.

7. The magnetic detecting device according to claim 1, wherein the magnetic detecting device detects a rotational direction and a rotational angle of the relative displacement of an detection object, which is connected to either one of the magnetic-field generating member and the magnetic sensor.

8. A torque sensor, to which the magnetic detecting device of claim 7 is applied, comprising;

a torsion bar working as the detection object, which is coaxially provided between a first shaft and a second shaft, the torsion bar converting a torque applied between the first and the second shafts into a torsional displacement;

a multipolar magnet working as the magnetic-field generating member, which is connected to either the first shaft or one end of the torsion bar;

a pair of magnetic yokes connected to either the second shaft or the other end of the torsion bar, the pair of the magnetic yokes forming a magnetic-flux circuit in the magnetic field generated by the multipolar magnet; and a pair of magnetic-flux collecting members for collecting the magnetic flux from the pair of the magnetic yokes, wherein the magnetic sensor detects the intensity of the magnetic field between the magnetic-flux collecting members.

9. A torque sensor for an electric power steering apparatus comprising;

a torsion bar provided in a steering shaft of the electric power steering apparatus;

a multipolar magnet connected to one end of the torsion bar;

a pair of magnetic yokes and a pair of magnetic-flux collecting members provided at a radial-outward position of the multipolar magnet, the magnetic yokes and magnetic-flux collecting members being connected to the other end of the torsion bar so that the magnetic yokes and magnetic-flux collecting members being rotatable relative to the multipolar magnet;

a magnetic sensor provided between the pair of the magnetic-flux collecting members for detecting intensity of magnetic field generated by the multipolar magnet;

wherein the magnetic sensor comprises;

a first magnetic detecting element for detecting density of magnetic flux passing through the first magnetic detecting element and outputting an output signal of a provisional detection value;

a second magnetic detecting element for detecting density of magnetic flux passing through the second magnetic detecting element and outputting an output signal of a reference value; and a comparator for calculating a detection deviation, which is a difference value between the provisional detection value and the reference value, wherein the comparator outputs a detection signal of an authorized detection value corresponding to the provisional detection value when the detection deviation is smaller than a predetermined threshold value, while the comparator outputs an abnormal determination signal when the detection deviation is larger than the predetermined threshold value.

* * * * *